(12) United States Patent
Krietzman et al.

(10) Patent No.: US 10,086,287 B2
(45) Date of Patent: Oct. 2, 2018

(54) LEVERAGING ONLINE GAME GOALS AND ECONOMY TO REWARD BETTER REAL WORLD BEHAVIORS

(71) Applicants: Mark Krietzman, Palos Verdes Estates, CA (US); Andrew Robinson, Virginia Beach, CA (US)

(72) Inventors: Mark Krietzman, Palos Verdes Estates, CA (US); Andrew Robinson, Virginia Beach, CA (US)

( * ) Notice: Subject to any disclaimer, the term of this patent is extended or adjusted under 35 U.S.C. 154(b) by 0 days.

(21) Appl. No.: 15/009,773

(22) Filed: Jan. 28, 2016

(65) Prior Publication Data
US 2016/0214018 A1    Jul. 28, 2016

Related U.S. Application Data

(60) Provisional application No. 62/109,007, filed on Jan. 28, 2015.

(51) Int. Cl.
| | |
|---|---|
| *A63F 13/69* | (2014.01) |
| *A63F 13/35* | (2014.01) |
| *A63F 13/216* | (2014.01) |
| *A63F 13/92* | (2014.01) |

(52) U.S. Cl.
CPC ............ *A63F 13/69* (2014.09); *A63F 13/216* (2014.09); *A63F 13/35* (2014.09); *A63F 13/92* (2014.09)

(58) Field of Classification Search
USPC .......................................... 463/31
See application file for complete search history.

(56) References Cited

U.S. PATENT DOCUMENTS

| | | | |
|---|---|---|---|
| 2007/0038559 A1* | 2/2007 | Jung ....................... | G06Q 20/10 705/39 |
| 2009/0070180 A1* | 3/2009 | Jung ....................... | G06Q 40/02 705/38 |
| 2012/0079608 A1* | 3/2012 | Heatherly .............. | G06Q 30/00 726/30 |
| 2012/0315986 A1* | 12/2012 | Walling .................. | A63F 13/10 463/31 |
| 2012/0315987 A1* | 12/2012 | Walling .................. | A63F 13/10 463/31 |

* cited by examiner

*Primary Examiner* — Pierre E Elisca

(57) ABSTRACT

A method to leverage a gaming infrastructure to encourage actions in a non-virtual environment to achieve virtual world benefits, the method may include participant installs an application on smart phone; the participant sets up an account on Gameco servers; application interacts with Gameco servers; Gameco servers provide participant opportunities to acquire virtual world benefits by completing certain real world activities or choices; participants acts or choses; and, participant is provided a virtual reward by Gameco.

9 Claims, 4 Drawing Sheets

LEVERAGING ONLINE GAME GOALS AND ECONOMY TO REWARD BETTER REAL WORLD BEHAVIORS

CROSS-REFERENCE TO RELATED APPLICATION

This application claims the priority to U.S. Provisional Patent Application Ser. No. 62/109,007 filed Jan. 28, 2015 the disclosure of which is incorporated by reference herein in its entirety.

BACKGROUND OF THE DISCLOSURE

1. Field of the Disclosure

The present disclosure relates generally to a method and system to drive game player choices and actions in real world settings to achieve virtual world benefits.

2. Related Art

Online and mobile gaming in a virtual world is well now as our first person RPG (role playing games). In 2014 online gaming was estimated as a 40 Billion USD industry. AS such, online gaming contributes significantly to the US economy. Conversely, excessive immersion in an online gaming environment has, by some, been identified as a possible cause of fatigue, obesity and reclusion. Others note improvement in coordination, vision and problem solving may be associated with immersive gaming.

SUMMARY

Disclosed herein are systems and methods to encourage and/or direct actions and accomplishments in the non-virtual world visa via the goal of obtaining virtual world benefits, including but not limited to points, online game characters, accouterments, items, level-ups, advantages, prestige, fame, accolades, and collectables.

Aspect of the methods and systems disclosed herein include the support for and/or promotion by Gameco of real world (non-virtual) positive conduct. Online gaming and gaming in general has been vilified by many for the seemingly habitual nature of some game environments to some persons. A method whereby Gameco encourages non-virtual world activities, and in particular positive activities, is a powerful tool to combat misperceptions about online gaming.

Aspects of the methods and systems disclosed herein include support for and/or promotion of combining online or virtual world activities with engagement of the real (non-virtual) world.

Aspects of the methods and systems disclosed herein include support for and/or promotion of health choice actions and activities.

Aspects of the methods and systems disclosed herein include support for and/or promotion of positive choice actions and activities Aspects of the methods and systems disclosed herein include support for and/or promotion of health choice actions and activities, including but not limited to food choice, excursive, vitamins, following medication regimes, reduction of stress.

Aspects of the methods and systems disclosed herein include support for and/or promotion of positive choice actions and activities, including but not limited to helping around house, chores, completing school work on time, obtaining grades at a predetermined level, doing good at work.

Aspects of the methods and systems disclosed herein include computing devices, health data collection devices or peripherals, including geolocation, and servers or devices at locations to which are in signal communication with Gameco servers and report activities and actions wherein rewards may be awarded for meeting threshold levels of actions or activities. In some instances a parent or other third persons is the funding (pay for) or subsidizes the virtual world rewards being earned/awarded. For example it may be a parent who has a credit card or bank account which Gameco servers are permitted to charge awards to when thresholds are met. In other instances a school may subsidize the reward. In other instances a third party such as a commercial entity will pay for or subsidize a virtual reward. For example, a computer manufacture or athletic show company may consider offsetting the all or a part of the virtual world reward as good marketing.

Aspects of the methods and systems disclosed herein include computing devices, health data collection devices or peripherals, including geolocation, and servers or devices at locations to which are in signal communication with Gameco servers and report activities and actions wherein rewards may be awarded for meeting threshold levels of actions or activities. In some instances a parent or other third persons may be designated by the participant (or the guardian of the participant) to be allowed to report good actions and thereby allow Gameco servers to decision is the threshold level of good actions has been met for an activity or a participant.

Aspects of the methods and systems disclosed herein include a method to leverage a gaming infrastructure to encourage actions in a non-virtual environment to achieve virtual world benefits, the method comprising: participant installs an application on smart phone; the participant sets up an account on Gameco servers; application interacts with Gameco servers; Gameco servers provide participant opportunities to acquire virtual world benefits by completing certain real world activities or choices; participants acts or choses; and, participant is provided a virtual reward by Gameco.

Aspects of the methods and systems disclosed herein include The method of claim 1, the method further comprising Gameco servers decisioning that additional opportunities exist for a specific participant at or near a specific location and Gameco notifies participant of the opportunity.

Aspects of the methods and systems disclosed herein may include Gameco servers contact funding computing device and request payment for virtual reward provided to participant.

Aspects of the methods and systems disclosed herein include a system or method to leverage a gaming infrastructure to encourage actions in a non-virtual environment to achieve virtual world rewards or items of desire, the method comprising: a participant using a computing device receive a notice from Gameco servers of an opportunity to act and achieve a virtual reward or benefit through actions outside of interacting with his/her computing device; participant performs an action in the real world; the participants is verified or confirmed as performing the activity by at least one of participants computing device, data collection device or third party computing devices and computing devices; and, Gameco servers determine if opportunity has been fulfilled and award virtual reward to participant. In some instances Gameco servers verify participant identity. In some instances the opportunity is a achieving a certain percentage grade on a test and the schools servers report the achievement to Gameco servers.

Aspects of the methods and systems disclosed herein include a system or method to leverage a gaming infrastructure to encourage actions including a participant's health data collection device is capable of being in signal communication with Gameco servers; Gameco servers provide participant via a computing device opportunities to acquire virtual world benefits by completing certain real world activities or choices; participants acts or makes a choice in response to the opportunity; servers determine that participant has met a threshold; and, participant is provided a virtual reward by Gameco. In some instance Gameco servers decisioning that additional opportunities exist for a specific participant at or near a specific location and Gameco notifies participant of the opportunity.

The computing devices/smart devices/data collection devices disclosed herein operate with memory and processors whereby code is executed during processes to transform data, the computing devices run on a processor (such as, for example, controller or other processor that is not shown) which may include a central processing unit ("CPU"), digital signal processor ("DSP"), application specific integrated circuit ("ASIC"), field programmable gate array ("FPGA"), microprocessor, etc. Alternatively, portions DCA devices may also be or include hardware devices such as logic circuitry, a CPU, a DSP, ASIC, FPGA, etc. and may include hardware and software capable of receiving and sending information.

BRIEF DESCRIPTION OF THE FIGURES

The invention may be better understood by referring to the following figures. The components in the figures are not necessarily to scale, emphasis instead being placed upon illustrating the principles of the invention.

In the Figures, like reference numerals designate corresponding parts throughout the different views. All callouts and annotations are hereby incorporated by this reference as if fully set forth herein.

FURTHER DESCRIPTION

Figure 1:
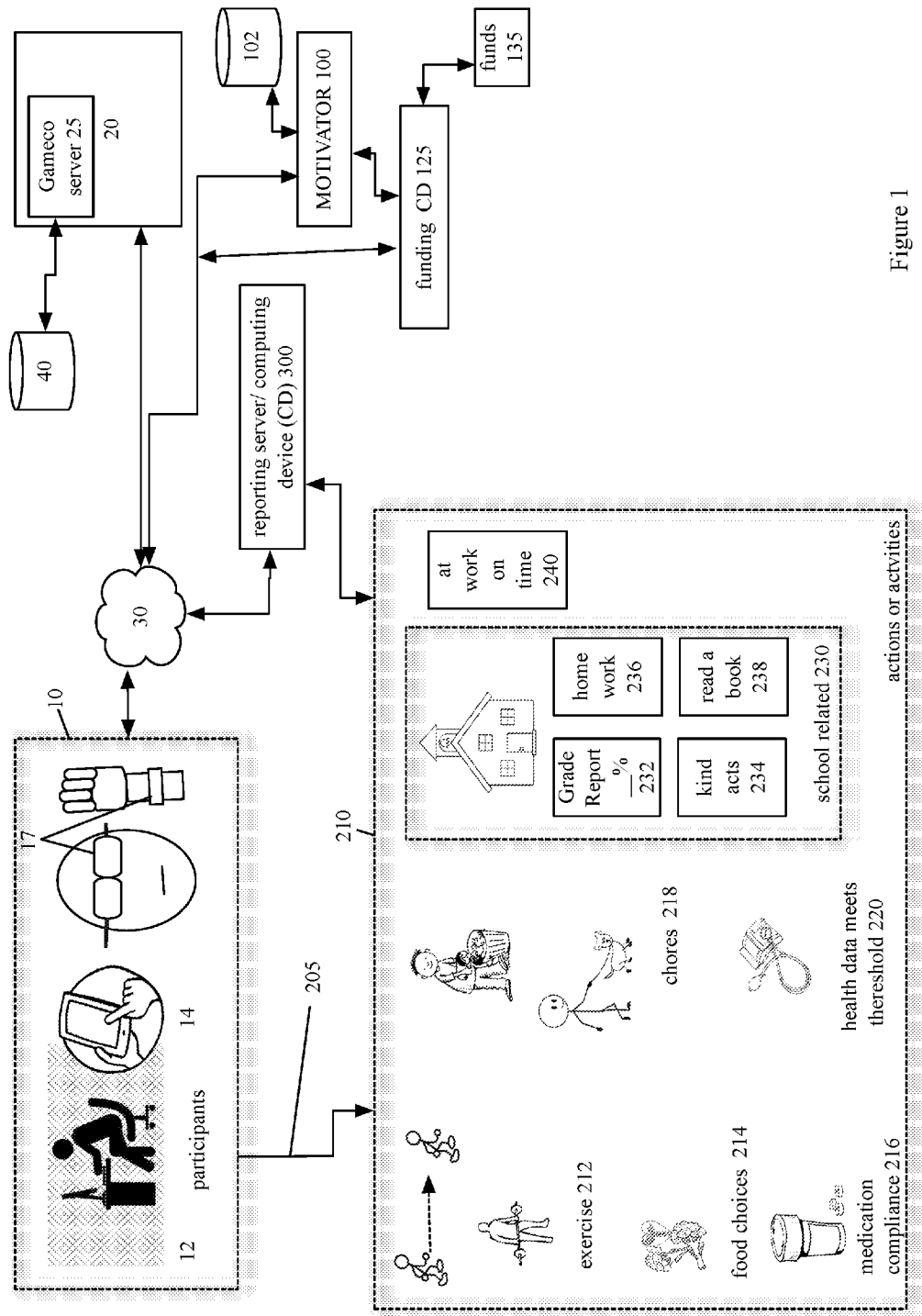
FIG. 1 is a representational diagram of aspects of a method and system whereby an online gaming platform or environment is utilized or leveraged to at least one of promote, motivate and urge behavior which may earn a participant benefits and rewards in the virtual or online world or economy and interactions between Gameco servers and reporting servers.

A scenario is established between a Gameco and one or more participants via computing devices in signal communication and MOTIVATOR who seek to utilize the online system as a mechanism to drive off-line activity. A MOTIVATOR may be the participant, a parent, friend, spouse, teacher, school, employer or the like who are promoting or supporting participants' positive, good and/or healthy choices and actions. In some instances a MOTIVATOR may be a commercial entity, a medical or health entity, a governmental entity that is subsidizing or sponsoring good choice activities and healthy positive actions.

Real world actions are actions beyond touching a keyboard, or mouse or touch screen to "surf" or use a computing device or interface to interact with websites or apps. Real world actions mean going somewhere and doing something physical that is not simply interacting with a computing device. However, part of the real world action may include using the computing device to receive notices, to authenticate and verify the activity or a part thereof.

In some exemplary implementations the off-line activity includes behaviors such as traveling to a particular location. Behavior or action may be required or desired within a particular time frame. In some instances the virtual world reward (or value) associated with a behavior by the participant may be fixed. In some instances the virtual world reward (or value) associated with a behavior by the participant may be dynamic and change as a function of thresholds set by MOTIVATOR or Gameco servers and the like. The commercial value to Gameco may in some instances be generally approximated by the difference between the online purchases of upgrades by participants who do not participate in off-line behavior to ear virtual world benefits versus those who do. The commercial value to Gameco may in some instances be generally approximated by the difference between the online purchases of upgrades by participants who do not participate in off-line behavior to earn virtual world benefits versus those who do plus advertising/marketing fees paid to Gameco for leveraging its infrastructure to drive behavior of participants. The commercial value to Gameco may in some instances be generally approximated by the difference between the online purchases of upgrades by participants who do not participate in off-line behavior to earn virtual world benefits versus those who do plus subsidies paid by MOTIVATOR to Gameco for the virtual benefits it distributes to drive behavior for MOTIVATOR.

Off-line activities may also be dynamic such as real world actions. Real world actions refer generally to actions that a participant completes in a non-virtual world environment and without interacting directly with the Gameco servers. Participant actions while interacting with the Gameco servers even the result of physical acts by the participant are not the non-virtual world actions referred herein.

Gameco derives revenue by linking one or more funding sources to its servers wherein actions or goals obtained by participants which earn participants rewards are paid for by such sources.

Gameco also obtains a positive impressions in the society by actively offering opportunities to have participants spend some amount of time in a non-virtual world At a simplified level aspects of the system and method disclosed herein include utilizing hardware referred to as computing or smart devices which may include internet streaming systems, gaming system, desktop computers, laptops, tablets, smart phones, televisions to acquire, receive, measure or otherwise capture and then transmit via signal communication data associated with an participants.

It is appreciated by those skilled in the art that some of the circuits, components, modules, and/or devices of the system disclosed in the present application are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semiconductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FFTs"), time-to-frequency conversations, frequency-to-time conversions, database mapping, signal processing steps, coding, modulations, demodulations, etc.

FIG. 1 shows a participant 10 who may use one or more computing devices 12 (computer system) 14 (smart phone/tablet/handheld internet connected device) and 17 wearable device in signal communication with a computing device and/or Gameco 20 and Gameco servers 25 via a network 30. Wearable device may be attached to any part of the body, r clothing and have sensors to monitor some health aspects such as steps, climb, heart rate, location Gameco servers are shown connected to one or more databases 40 wherein information is stored. Participant sets up an account at Gameco servers.

In a simplified operation Gameco 20 communicates with at least one MOTIVATOR 100 visa vie a computing device. Gameco rule and decision engines set-up, schedule, determine, suggest and the like the parameters of MOTIVATORS 100 desired participant 10 behavior to achieve benefits in the virtual world for real world actions. MOTIVATOR servers also may provide all or some of their stored data it has in its database 102 on participant such as grades, turning in homework, going to a gym, medical measurements, food choice, compliance with health or medical needs whereby Gameco servers develop or record threshold levels of real world activity or types of activity participant needs to accomplish to earn virtual rewards. The actives may be very specific and targeted to even a single participant based on the goals set. One or more of the participant, MOTIVATOR and Gameco determine the desired activities and thresholds. A funding source, which may utilize a computing device (CD) 125 provides Gameco servers a for of payment such as bit coin, currency, debit card, credit card or linked bank account 135 to pay for or subsidize earned virtual reward.

Visa vie an application installed on the participants computing device, linked device or interaction of the participant via a computing device with Gameco website and servers, the participant receives notifications or reminders of activities he/she can perform in the real world to earn virtual world benefits. The activities may be geo-linked wherein if participant is at the gym, or a restaurant school he/she may receive a notification of activities he/she can act upon that are specific to the school, or home, or work environment.

The participant may also chose to check in via his/her computing device at a location such as school, work or gym wherein he/she is providing Gameco servers data on actions or requesting that the location servers provide the data whereby Gameco servers are advised of the identity of the participant engaged in the activity. At school, and for graded work or test results school computerized grade systems such as EDLINE™ and AERIES™ can be linked via parent to Gameco to compare result and threshold. If a threshold is met then a reward may be given. Parent can set account with funds to pay for reward if the servers/system establishes threshold met. In some instances funding may be subsidized by school or work or via advertiser. For children parents computing device may be a verification server/system.

The participant, when acting in the real world 210, can meet threshold levels of activity or actions to earn benefits and virtual world rewards. Activities include exercise 212, health food choices 214, medication compliance 216, chores 218, the activities may be school related 230 and include grade or test or performance reports 232 at a threshold level, or kind acts (as reported or observed) 234, or turning in home work on time 236 or things like reading a book 238. Other actions or activities may be an employee at work 240, wherein the employee (participant) is on time, or does a good job and instead of getting an employee of the week button he/she will receive a virtual reward which may also be subsidized or paid for by the employer.

Activities of the participant is reported to Gameco servers via a reporting server 300 via a network. If Gameco servers determine that participants activities have met the threshold level then Gameco can verify the funding/payment and notify participant of the obtainment of a virtual reward.

It is preferred that the participant is authenticated to Gameco servers when he/she acts to provide participant a virtual world benefit for the behavior. A non-exclusive list of authentication means include, voice recognition at a location via a server. Facial recognition. Other biometric authentication. Geolocation via participant computing device.

Data collection devices can verify participant actions to Gameco servers.

Figure 2:
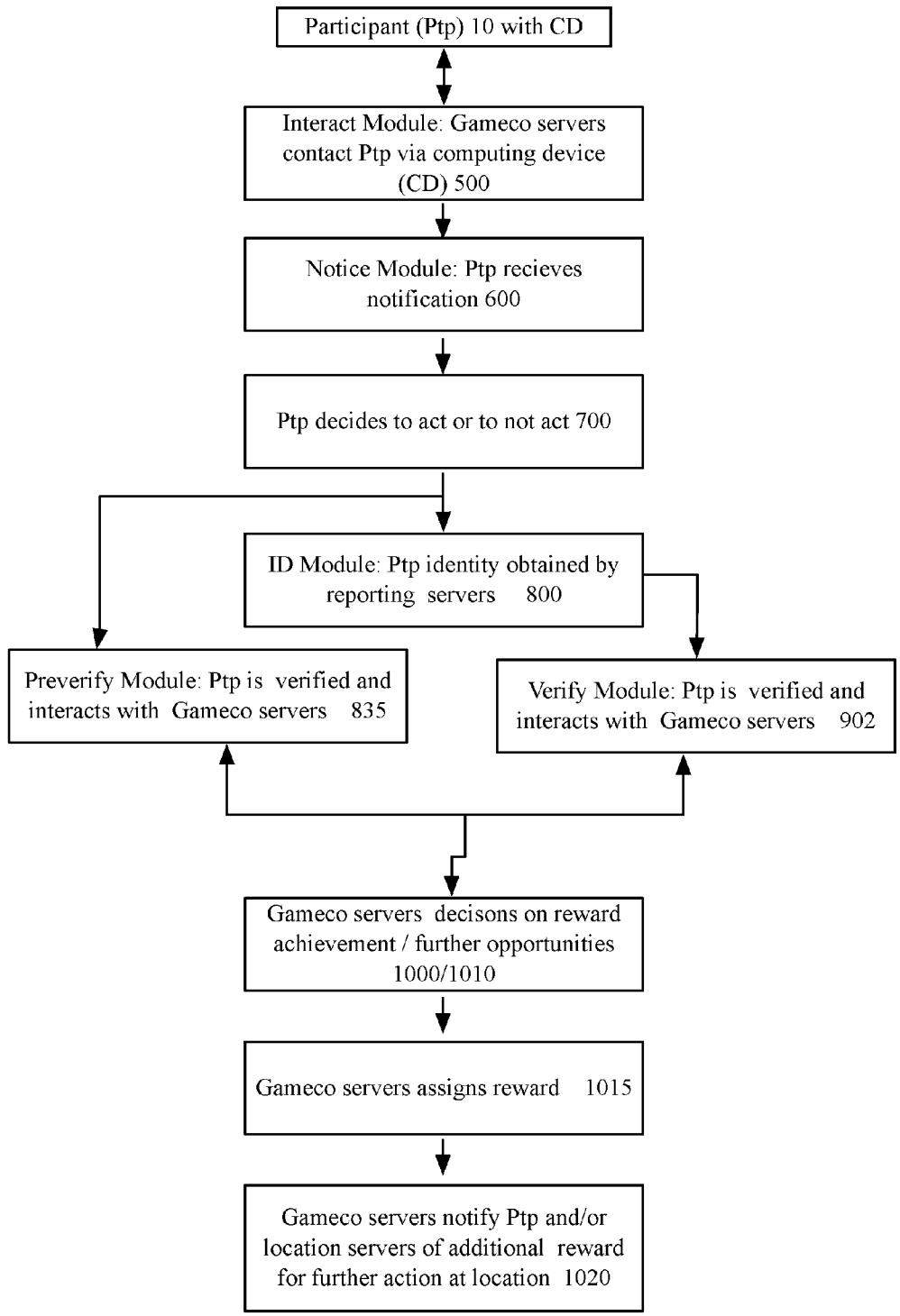
FIG. 2 is an overview diagram of aspects of an exemplary method and system wherein participants interaction with Gameco servers and location servers as well as location server interactions with Gameco servers.
Figure 3A:
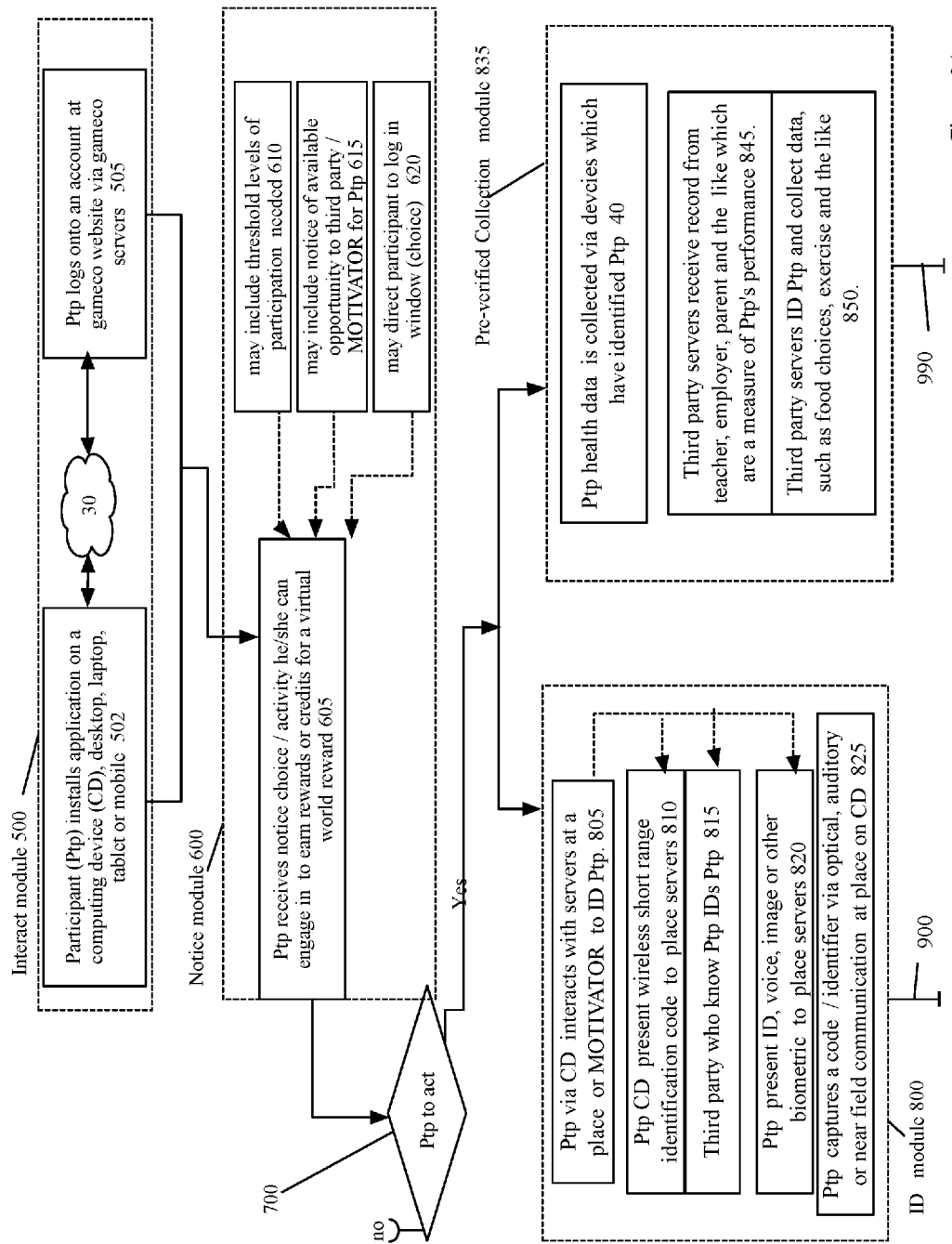
FIGS. 3A-3B are an overview diagram of aspects of an exemplary method and system wherein participants interaction with Gameco servers and place/location servers as well as third party, participant and place computing devices interactions with Gameco servers.
Figure 3B:
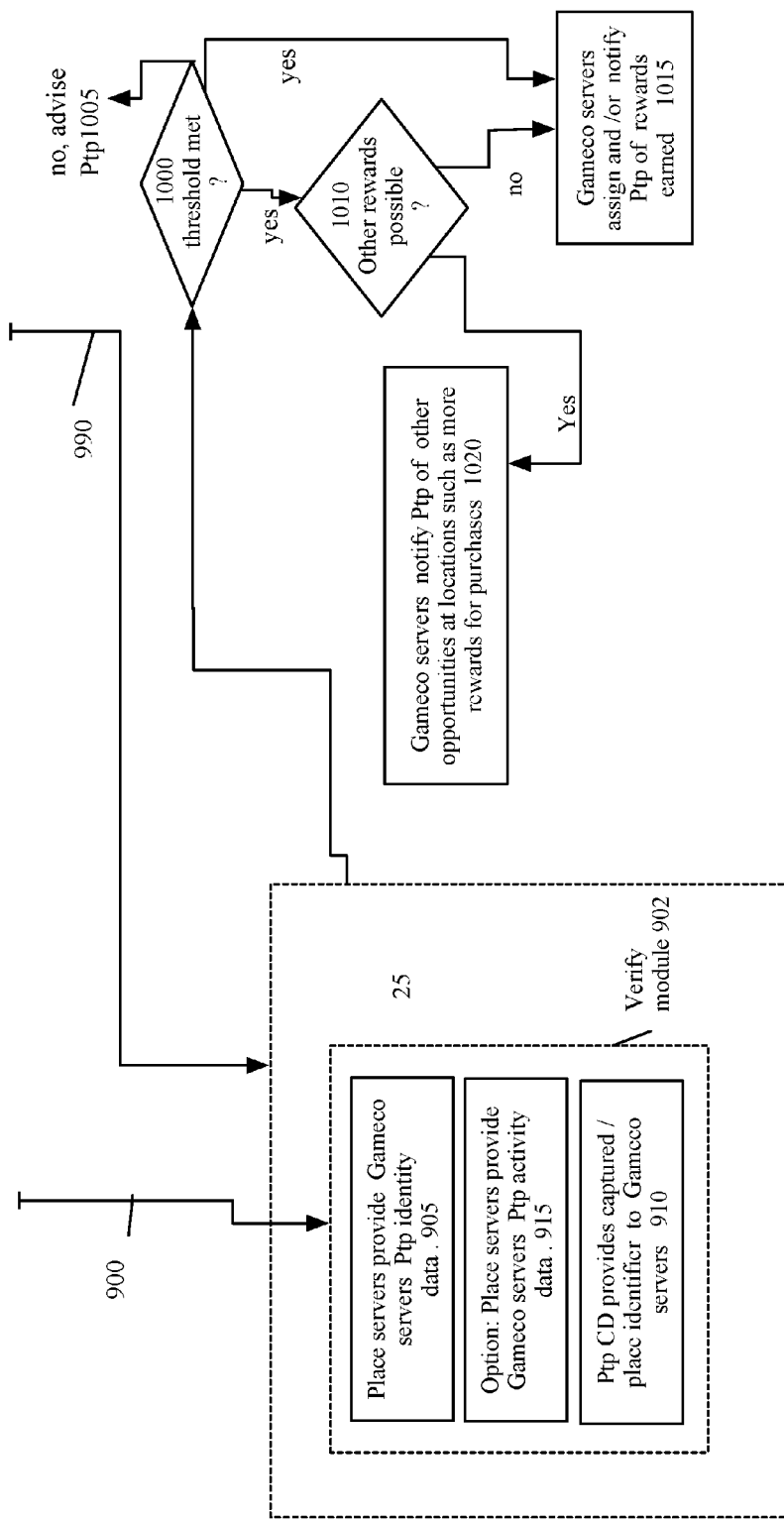

FIGS. 2 and 3A-3B are diagrams showing aspects of several methods and systems disclosed herein including process steps, decisioning and modules for interaction, notification, identification, and verification.

Participant 10 interacts with Gameco servers via the interaction (or communication) module 500. Via the interactions with Gameco servers 25, participant visa vie a computing device will receive notifications (from the Notice module 600) of opportunities to earn virtual rewards via behavior in the real world. Opportunities may be dynamic and changing based on a location of participant or a set of criteria regarding choices, actions and the like participant or MOTIVATOR seeks to encourage. A participant will then decide whether or not to act 700. At this juncture, a participant may be identified via an ID module 800 or via a pre-verification module 835. If identified without pre-verification then Gameco servers perform an additional step to verify the participant via a verification module 902.

Once a participant has decided to act on an opportunity to make a good/health choice or perform a pre-defined activity, or achieve a goal designated by (or the result of preferences set up) by MOTIVATOR, Gameco servers or the participant Gameco rule and/or decision engines will determine if a threshold level associated with the action or choice was met 1000 and if additional actions or choice are available to participant to achieve further rewards at that time 1010. Gameco servers then assign rewards 1015 or advise if other rewards are possible then Gameco servers may contact one of participant computing device, MOTIVATOR computing device or a place computing device 1020.

FIG. 3A-3B is an overview of aspects of methods disclosed herein. Through an interact module 500 a participant either with a computing device having a application (software) installed 502 communicates through a network 30 with Gameco servers, or the participant through a computing device interacts through a network 30 with a website to Gameco servers 505. Through interactions with at least one of the application and website the participant, or a designee populates data about goals, choices, activities that the participant (or designee) has identified as real world action the participant should or desires to achieve to earn virtual benefits in the virtual world set up via Gameco's virtual world and economic infrastructure. Designees may be peers, teachers, relatives, spouse, employer and the like. A designee must be designated by or accepted as a designee by, participant. A designee may be a MOTIVATOR and/or a funding source. The overview of the relationships is one of person or entity seeking to motivate or urge certain behavior or choice which are selected or estimated to be positive and beneficial to the development of happiness of participant in the real world by allowing the participant to earn virtual world benefits and rewards through such actions and choice. However, participant needs to be identified to align earned rewards with persons and the activity needs to be quantified to be able to decision if goals or threshold levels have been met. Quantification and reporting of actions and choice may be via third parties using computing devices that can report to Gameco servers, via participants computing device, via data collection device near, wearable, implanted or connected to participant. In some instances reporting may be via a third party computing device such as a teachers input of grades or homework records in a grade and homework database which can be authorized to provided data about participant's performance.

Via a notice module 600 participant is reminded of, and/or urged to act or chose well 605. Choice notifications may include threshold levels 610, may include notice of available opportunity to third party/MOTIVATOR for participant 615, and may direct participant to log in window (choice) 620.

Next participant decides to act or not act 700.

If the decision to act/chose is made and participant acts/choses to agglomerate data of participants action or choice an ID module may be utilized 800. Participant via computing device may interacts with servers at a place (such as school, home, restaurant, gym) or a computing device or server of MOTIVATOR (teacher, parent and employer for example) to identify the participant 805. The following non-exclusive list of identification means may be used in multiples and need not be solo. Identification may be via participant's computing device or data collection peripheral 17 (glasses, wristband, watch, sensor, monitor and the like) having a wireless short range signal communication. The data collection peripheral or the computing device may use an identification code or handshake to additional data collection servers 810. Authenticated or approved third party servers may identify participant 815. Participant may present voice, image or other biometric to place servers 820 to establish participants identification. Participant may captures a code/identifier via optical, auditory or near field communication at place on his/her computing device 825 or data collection device 17. The above computing devices being capable of being in signal communication with other computing devices including Gameco servers 900.

If the decision to act/choice is made and participant acts/chooses to agglomerate data of participant's actions or choices a Pre-verification module may be utilized 835. For example health data collection devices either on participant or which can identify participant and agglomerate data about participant actions (for example heart rate, blood pressure, blood sugar, breath, excretion, breathing, food choices, exercise and the like) collects data and/or choices 840. Third party servers may receive records from a teacher, employer, parent and the like which are a measure of performance 845. Third party servers may collect data, such as food choices, exercise and the like 850. The collected data about participant is transmitted 990 via computing device through a network to Gameco servers 25.

Gameco servers 25 determine if a threshold for an activity or choice is met 1000 and if "no" may advises participant of additional metrics which need to be met to achieve threshold. If threshold is met the servers may decision if additional rewards are possible at that time 1010. If "yes" then Gameco servers assign award and may also notify one or more of participant, designee, MOTIVATOR of award achievement 1015. If additional opportunities for awards of virtual world benefits from more real world activities or choices exist for participant they may be notified of same 1020. In some instances an opportunity may be local, time constrained, activity or choice limited, date constrained or they may be cumulative.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method to leverage a gaming infrastructure to encourage actions in a non-virtual environment to achieve virtual world benefits, the method comprising:
   a participant installs an application on a smart phone;
   a motivator provides Gameco servers with real world activities or choices;
   Gameco servers provide participant opportunities to acquire virtual world benefits in a virtual environment by completing the real world activities or choices;
   participant acts or choses; and
   participant is provided a virtual reward by Gameco.

2. The method of claim 1, the method further comprising Gameco servers decisioning that additional opportunities exist for a specific participant at or near a specific location and Gameco notifies participant of the opportunity.

3. The method of claim 2 the method further comprising Gameco servers contact funding computing device and request payment for virtual reward provided to participant.

4. The method of claim 1, the method further comprising participant sets up an account on Gameco servers.

5. A method to leverage a gaming infrastructure to encourage actions in a non-virtual environment to achieve virtual world rewards or items of desire, the method comprising:
   a motivator provides Gameco servers with real world activities or choices;
   a participant using a computing device receive a notice from Gameco servers of an opportunity to act and achieve a virtual reward or benefit through the real world activities or choices provided by the motivator outside of interacting with his/her computing device;
   participant performs a real world activity or choice action in the real world;
   the participants is verified or confirmed as performing the activity by at least one of participants computing device, data collection device or third party computing devices and computing devices; and Gameco servers determine if opportunity has been fulfilled and award virtual reward to participant.

6. The method of claim 5, the method further comprising Gameco servers verify participant identity.

7. The method of claim 5, the method wherein the opportunity is a achieving a certain percentage grade on a test and the schools servers report the achievement to Gameco servers.

8. A method to leverage a gaming infrastructure to encourage actions in a non-virtual environment to achieve virtual world benefits, the method comprising:
   a participant's health data collection device is capable of being in signal communication with Gameco servers;
   a motivator provides Gameco servers with real world activities or choices;
   Gameco servers provide participant via a computing device opportunities to acquire virtual world benefits by completing the real world activities or choices;
   participant acts or makes a choice in response to the opportunity;
   Gameco servers determine that participant has met a threshold; and
   participant is provided a virtual reward by the Gameco servers.

9. The method of claim 8, the method further comprising Gameco servers decisioning that additional opportunities exist for a specific participant at or near a specific location and Gameco notifies participant of the opportunity.

\* \* \* \* \*